Oct. 28, 1969    H. L. DRAPER ET AL    3,474,625
LAMINATES OF A POLYOLEFIN FABRIC AND/OR FILM
AND ASPHALTIC MATERIAL
Filed May 29, 1967

INVENTORS
H. L. DRAPER
R. J. BENNETT
D. W. GAGLE
BY Young ; Quigg
ATTORNEYS

United States Patent Office 3,474,625
Patented Oct. 28, 1969

3,474,625
LAMINATES OF A POLYOLEFIN FABRIC AND/OR FILM AND ASPHALTIC MATERIAL
Homer L. Draper, Richard J. Bennett, and Duane W. Gagle, Bartlesville, Okla., assignors to Phillips Petroleum Company, a corporation of Delaware
Filed May 29, 1967, Ser. No. 641,749
Int. Cl. E02b *5/02;* C08d *13/24*
U.S. Cl. 61—1     11 Claims

ABSTRACT OF THE DISCLOSURE

Laminates containing polyolefin fabrics and/or films and asphaltic material, in one embodiment the whole being covered with rock chips or similar aggregate material, in another the fabric being laid on concrete or asphalt, as in a roadway, especially over joints or cracks and covered with asphaltic material, e.g., hot mix, the top surface of the fabric providing a slippage plane to prevent cracking, and, in still another embodiment, encompassing a film of polyolefin between two layers of fabric, the fabric in a preferred embodiment being made of polypropylene and the film of polyethylene. In an embodiment of a pit, a structure, or system thereof is applied as liner for a pond or storage pit or covering for a surface as on the ground. In a now preferred form the liner is anchored by an anchoring means comprising a trench. In a further embodiment, it can be applied to asphalt planks as these may be used to prevent leaking. In one or more of the embodiments, there can be used together with an anionic and a cationic asphalt emulsion employing these in conjunction with a film, a strip, a fabric, or non-woven cloth or plastic including rovings.

---

Figure 1:
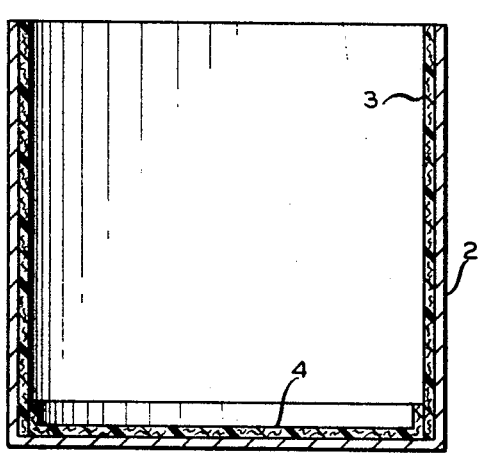

This invention relates to the structuring of a laminate system. In one of its aspects, it relates to a composite of a thermoplastic or similar fabric with a binder material. In another of its aspects, it relates to the compositing of such a fabric and a film made of thermoplastic material also with a binder material. In a more specific aspect, the invention relates to the use of a laminate system as a liner for a storage place.

In one of its concepts, the invention provides a polyolefin fabric composited with an asphaltic material. In another of its concepts, the invention provides several layers of a polyolefin fabric having interleaved between at least two of them a film of polyolefin material. In a still further concept, the invention provides an overlay of a polyolefin fabric bonded to a surface having joints or cracks to provide a slippage plane for a later-to-be-applied surface of, say, asphalt, as in the resurfacing of a deteriorated roadway. In a further concept the invention provides a strip, film, fabric, or other material, for example, non-woven plastic or rovings layered between an anionic asphalt emulsion and a cationic asphalt emulsion. In a further concept the invention provides a storage place liner, for example, a pond or ditch liner. In a further concept the invention provides means for anchoring such a liner as used in a pond against slippage, the anchoring being accomplished by means in combination with a trench. In another concept, the invention provides a covering for asphalt planks.

It is known in the art to provide various laminates of one or more of different kinds of materials. For example, it is known to cover an aluminum stearate impregnated fabric on the surface of a road or canal base which has previously been prepared, and which may have been primed with a flux oil or cut-back liquid asphalt preparation, then allowed to cool and then covered by addition of the fabric which may itself be treated with an asphalt cut-back oil and sand spread on top. Also, it is known to cover the fibrous fabric material with a coating of asphalt and cut stone which is then rolled and finally given a top coat of asphalt. It is also known to provide a roofing sheet formed of sheet material having a foraminous sheet of woven wire mesh or similar material sealed to the surface thereof at spaced intervals and covered with a bitumen coating of asphalt, bituminous macadam, or bituminous mastic. Many other combinations of laminates are known.

This invention relates to a lightweight, readily constructed laminate system or structure which has been found to be particularly useful and to yield results attributable to the specific materials from which it is built. Thus, it has been found that a polypropylene fabric such as "Loktuft" (a trademark) is combinable with an asphaltic material such as asphalt to produce an overlay, or lining, or cover having highly advantageous fluid or liquid sealing properties. The polypropylene fabric here mentioned holds about four times its weight of asphaltic materials as compared with a felt paper which holds but twice its weight of the same materials. Further, it has been found that using polypropylene fabric such as "Loktuft" to repair a deteriorated road surface by first spraying the surface with asphalt emulsion, rolling on "Loktuft" and then putting on an overlay of, say, asphalt emulsion, cut back asphalt, hot mix, etc., reflection cracking of the new surface is still avoided after several months of testing, whereas a substantially identical surface conventionally treated, that is to say without the fabric, has significantly deteriorated in the same period of time.

Further, it has been discovered that interleaving a film of, say, polyethylene between two layers of lapped polypropylene fabric in a polypropylene-asphalt structure results in a leak proof laminate, whereas using a single layer of polypropylene fabric with 12″ laps at the joints and asphalt yielded a liner which leaked. Still further, it has been conceived that a seepage as for an earthen excavation can be constructed by a tamping step, application of asphalt anionic emulsion to the exposed surface, laying thereupon a non-woven plastic fabric or overlap strips (about 50 percent overlap), and then applying a cationic asphalt emulsion thereover; optionally, overlaying the whole with additional materials herein described to produce a high crack and tear resistance structure or laminant of particular value in lining ponds, e.g., waste disposal ponds or other reservoirs. Still further, features of the invention can be applied to asphalt planks. Further still as an important feature of the invention there is provided peripherally of a storage pond an anchoring trench, ditch, or other like unto excavation in a preferred form shaped, arranged and more preferably filled to retain a portion of the liner therein and anchor it against slippage in the pond or ditch.

It is an object of this invention to provide a laminate structure. It is another object of this invention to provide a laminate structure suitable for covering or lining tanks, ditches, canals, ponds and the like for storage therein of various liquid materials which may even be corrosive. Another object of the invention is to provide a unique anchoring means to prevent slippage of a liner as herein described. It is a further object of this invention to provide an overlay for the construction or repair of a surface such as a roadway whereby to prevent reflection cracking of a surface to be laid on said surface or roadway.

Other aspects, concepts, objects and the several advantages of this invention are apparent from a study of this specification, the drawings, and the appended claims.

According to the present invention, where is provided a laminate which can be used as a covering or a lining in which one of its forms comprises at least a polyolefin fabric and an asphalt-like or asphaltic material.

In one embodiment of the invention, there is provided as a liner for a pond, or storage pit, or a covering for a surface as on the ground or a roadway of concrete or asphalt, or other structure, or the like, as for storage of liquids, or repair of a structure or roadway, or laminate system consisting of a polyolefin, e.g., polypropylene fabric impregnated with an asphalt-like material, e.g., asphalt. The system of the invention can be built a priori and then installed. It also can be composited at the site of use or at the place in which it will be left and used. Also according to the invention, a layer of the fabric and a layer of film can be combined with an asphalt-like material. Thus, a film of polypropylene or polyethylene can be composited with a fabric of polypropylene or polyethylene, or any combination of polyolefins or other polymers or copolymers fabric or film can be used. Substitution of fabric and/or film can be made upon mere routine testing of the particular material, its structure and the intended use. A now preferred fabric is a polypropylene fabric such as "Loktuft."

"Loktuft" is a non-woven fabric of polypropylene fibers and is available from Revonah Spinning Mills, Trenton and Castor Ave., Philadelphia, Pa. "Loktuft" is available in rolls of about six feet width and lengths of about 200 to 300 lineal feet. "Loktuft" has a weight of about four to six ounces per square yard, a tensile strength in the "warp" direction of 80–90 pounds and a tensile strength in the fill or woof direction of about 90–100 pounds. "Loktuft," we have found, will hold up to about four time as much asphalt material as will burlap mats, cotton fibers, woven cloth, etc.

The preferred film now is polyethylene since the combination of it with the above-described fabric has yielded desirable results.

The asphaltic material can be applied to the fabric by impregnation, painting, spraying or any other manner in which such materials are ordinarily applied. Preferably, as when walls are being covered, the fabric is positioned in place and then sprayed with sufficient asphaltic material, for example, an asphalt emulsion, to embody the fabric into the asphalt.

A now preferred form of the laminate which has given absolutely leak proof result is that in which there has been interleaved a film of polyethylene between two layers of polypropylene fabric, and the entire structure bonded with asphalt, that is to say, the surface to which the laminate is to be applied was first coated, the fabric then applied and sprayed or otherwise coated; the film was then applied followed by another layer of fabric and the whole again coated.

The order of coating and the manner of coating are not critical so long as an adequate bonding an adequate sealing of the fabric are obtained. This kind of structure is particularly interesting from a number of points of view. It is possible to use a thickness of film such that it is closely espoused between the fabric layers. Further, with use of film which is relatively light in weight and more easily managed, it is possible to use smaller overlap layers of fabric to build a laminate in which the film is continuous albeit the layers of fabric are discontinuous as applied.

Thus, according to the invention, there is provided a laminated structure or system in which there are bonded together, with asphalt or similar material, layers of polypropylene fabric having between them a film of polyethylene. Various combinations of polyolefin fabric and of polyolefin film can be made. Such a structure can be produced with films and fabrics of different sizes. The film between the fabric layers is protected against damage by the fabric layers and is flexible in the sense that movement of the layer or layers of fabric, or of the overall structure, can be quite considerable without rupture of the film, thus avoiding leakage. The film can be of various or different thicknesses. Usually a film of from about 6 to about 10 mils will be used. The fabric of polypropylene, which is now contemplated for all of the modifications herein disclosed, is that earlier described, namely "Loktuft."

Further according to the invention, in an embodiment in which "Loktuft" has been employed to cover cracks in a concrete road, the cracked and deteriorated roadway area, which had a poor subgrade condition, was covered with a membrane of polypropylene fabric, laid on sprayed asphalt emulsion, and then covered with another application of asphalt, following which it was covered with rock chips. A similar deteriorated area near the patched area was repaired in conventional manner, that is to say, covered with the same asphalt emulsion and rock chips. After 7 months, the area containing the fabric membrane is still in excellent condition, but the area conventionally patched is significantly cracked. Thus, the use of the "Loktuft" membrane provided a slippage plane to permit the roadway to expand and to contract yet avoiding reflection cracking from the old surface or the joints therein. A newly laid surface can be similarly treated.

Still further according to the invention, the asphaltic material used can consist of an anionic and a cationic emulsion having one or more of the polyolefin materials layered, say, first one of said emulsions and covered with the other. Further, combination of such a laminant with other materials as by way of covering the laminant are possible.

Still further according to the invention, the prevention of leakage of asphalt planks as these are used, for example, to line a reservoir, by covering them with a structure according to the invention herein described, for example, one which can be made using emulsions just mentioned is advantageous.

It is within the scope of the invention to build a system of layers including more than one film, when film is used, and more than two layers of fabric when more than one layer of film is used. Also such layers may be double or plural ply. In some instances, the fabric layer can be encompassed between several film, but this is not now preferred for all uses.

The laminates or systems of the invention are especially useful for storage of chemicals, brine, liquid fertilizers and can be used to line pits, ditches, tanks, ponds, etc., especially where contamination of the ground is to be avoided. Further, laminates according to the invention can be applied to landing strips, or to the making thereof, as roofing, and a large variety of other uses. Anchoring means for laminates so applied will be like unto those herein described.

The laminate of the invention can be covered with aggregate such as rock chips, sand, stones, etc.

Figure 2:
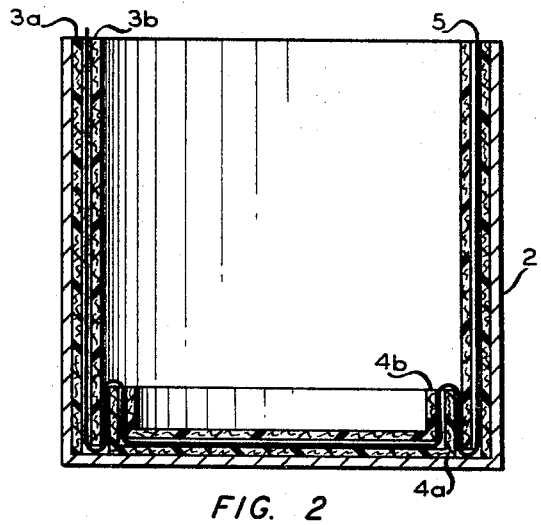
Figure 3:
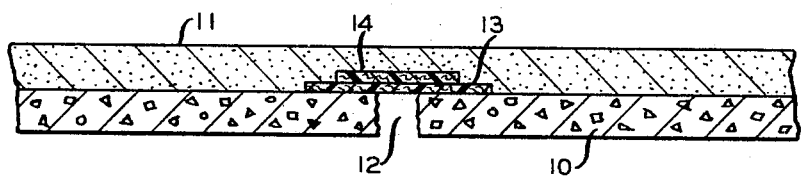
Figure 4:
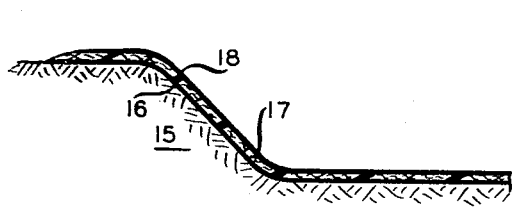
Figure 6:
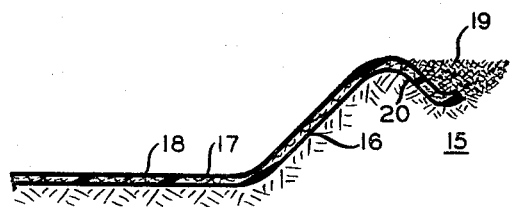
Figure 5:
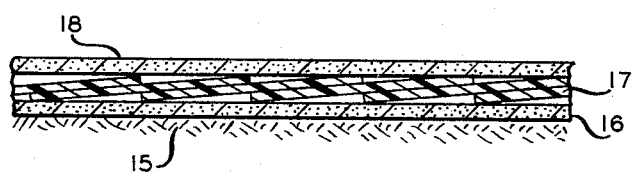

In the drawing, FIGURE 1 illustrates the invention as applied to a tank and shows in elevational cross section the structure of a polypropylene fabric asphalt system. FIGURE 2 shows such a system including a polyethylene film. FIGURE 3 shows in elevational cross section the use of polypropylene fabric overlay for sealing a joint in a roadway. FIGURE 4 shows an earthen pit in which there is shown a seepage barrier using an anionic asphalt emulsion, strips of non-woven plastic, with overlap, and a cationic asphalt emulsion thereover. FIGURE 5 details the barrier of FIGURE 4. FIGURE 6 shows a preferred anchoring means for the liner of FIGURE 4.

Referring now to FIGURE 1, 2 is a tank wall made of metal, the tank is covered on its inside walls with polypropylene fabric impregnated with, and held to the wall by, asphalt as shown. In the bottom of the tank, the fabric 4, which extends in all directions substantially beyond the bottom of the tank, is folded up all around the tank and is also impregnated and made fast to the tank by asphalt which has been sprayed thereon while the fabric has been held in the desired position by means not shown and later removed.

Referring now to FIGURE 2, the tank 2 is provided with a double layer of polypropylene fabric, the layers are 3a and 3b on the walls of the tank and 4a and 4b in the bottom of the tank, a continuous film 5 of polyethylene extends between the layers 3a, 3b and 4a, 4b. It will be seen that the film 5 passes downwardly along the walls between the polypropylene fabric layers, emerges at the tank bottom and from there passes upwardly between inner layer 3b and bottom layer 4a of the polypropylene fabric and is then espoused between bottom layers 4a and 4b of polypropylene fabric.

Referring now to FIGURE 3, 10 represents an old concrete pavement over which an asphalt overlay 11 has been laid. Prior to placing the asphalt overlay into position, as by rolling hot mix onto the old concrete pavement, at joint 12 where have been placed into position two layers of polypropylene fabric 13 and 14 extending the width of the roadway. It will be seen that strip 13 is wider across joint or crack 12 than is 14. The contraction and expansion of the old concrete pavement at joint 12 can take place without causing cracking of the asphalt overlay.

Referring now to FIGURES 4 and 5, the number 15 represents a relatively smooth earthen surface which has been formed in the shape of a reservoir in the earth, and tamped on the floor and sides thereof. Asphalt material, preferably an anionic or non-ionic asphalt emulsion, 16, is applied to the tamped earthen surface 15 to penetrate the surface in order to consolidate this surface. Upon 16 is placed a non-woven mat 17 of plastic material, e.g., "Loktuft," preferably applied in rolls and overlapping by about 50 percent, as shown (50 percent overlap being as effective as a two-ply layer of the non-woven material). The mat 17 is preferably applied before the asphalt material 16 as "set," so that the mat 17 will adhere firmly to the asphaltic substrate. A layer of asphaltic material, preferably a cationic asphalt emulsion 18, is applied to the non-woven mat 17. More than one layer of non-woven mat may be used. That is, a second application can be made of mat over coating 18, and a final coating of asphalt material can be made thereover (not shown).

The periphery of the laminate structure of FIGURE 4 is preferably buried in a trench 19 as shown in FIGURE 6, to anchor the laminate structure against slippage and to prevent undercutting from rainfall or dislodging of the liner due to flooding. Trench 19 can be from about 10" to about 18" in depth, preferably about 12" to 15". The inside wall 20 of trench 19 preferably has a slope such that it makes an angle of from about 30° to 60°, preferably about 45°, with the vertical. The trench is preferably back-filled with dirt that is free of large stones and compacted firmly. This construction provides a retaining force acting on the liner to prevent its removal from the reservoir.

For certain applications, for example, wherein the earth formation is of clay, and in other formations, we have found that a cationic asphalt emulsion may be utilized as the sole emulsion used. That is, the consolidating application is a cationic asphalt emulsion and the final layer over the mat is the same cationic emulsion. We have also found that for certain applications, and especially where only one type of asphalt emulsion is available, that we can, although not now preferred, use an anionic asphalt emulsion only, we can use a non-ionic asphalt emulsion only, or we can use a cationic emulsion only.

In one operation, the consolidating asphalt emulsion was a non-ionic asphalt emulsion, and the final asphalt emulsion was a cationic asphalt emulsion applied to the polyolefin mat. This proves to be an excellent system.

These various asphalt emulsions are known to those skilled in the asphalt field and are not elaborated on herein.

The amounts of asphalt emulsions used are not critical except that sufficient materials must be used to properly consolidate the earth and to properly impregnate the mat. In some applications, it is necessary to test or analyze a section of the surface to be treated to determine the type or the types of emulsions and the amounts thereof to use.

The polyolefin of which "Loktuft" is made is known in the trade as a Marlex (Trademark) polyolefin. Such a polyolefin can be prepared according to a process set forth in U.S. Patent No. 2,825,721, John P. Hogan and Robert L. Banks, issued Mar. 4, 1958. The disclosure of said patent is incorporated herein by reference. The polyolefins of said patent are known as high density polyolefins. Although various polymers and copolymers of the several olefins described in said patent can be used, as can be others, to execute the various embodiments of the invention here described or variants thereof, it is now preferred to use a polypropylene fabric and a polyethylene film because of the respective properties of these polyolefins.

A "fabric" as the term is employed herein is a woven structure or at least a matting of fibers.

Reasonable variation and modification are possible within the scope of foregoing disclosure, the drawings and the appended claims to the invention, the essence of which is that polyolefin fabric has been found preeminently suited, because of its flexibility and other properties, to be useful to prepare asphalt laminate structure, in one embodiment, the fabric being impregnated by and encompassed within an asphalt material; in another embodiment there is interleaved a polyolefin film between the layers of polyolefin fabric; and in a third embodiment the laminate structure of the invention is applied to provide a slippage plane to avoid reflection cracking of an overlay upon an old, deteriorated surface having cracks and/or joints therein.

We claim:

1. A laminate system or structure comprising a plurality of polyolefin fabric layers impregnated and bonded together with an asphaltic material wherein there is interpositioned between said layers of polyolefin fabric an imperforate polyolefin film bonded together by said asphaltic material with said layers of polyolefin fabric.

2. A structure according to claim 1 wherein the fabric is made of at least a high density polypropylene.

3. A structure according to claim 1 wherein the fabric is a polypropylene and the film is a polyethylene.

4. A reservoir comprising as a lining extending over its inner walls a laminate system according to claim 1.

5. A laminate system according to claim 1 wherein the fabric is impregnated first with one of an anionic asphalt emulsion and a cationic asphalt emulsion and then with the remaining one of said emulsions.

6. A storage pit or pond comprising as a liner extending over its inner walls a laminate system according to claim 5.

7. A container structure adapted to contain a liquid having therein on its walls to protect its walls against loss of fluid therefrom a laminate structure according to claim 1.

8. A structure according to claim 7 wherein the fabric is made of at least polypropylene and the film is a polyethylene film.

9. A structure according to claim 7 wherein the fabric is made of at least a high density polypropylene.

10. A road surface comprising, at a crack or joint therein, a layer of polyolefin fabric impregnated with asphaltic material overlying said crack or joint, and thereover an overlay of a further layer of surfacing material on said impregnated polyolefin.

11. A surface according to claim 10 wherein the polyolefin fabric is made of at least polypropylene.

References Cited

UNITED STATES PATENTS 1,637,480    8/1927    Gage _____ 94—18.2
2,210,774    8/1940    Perrin et al.

(Other references on following page)

UNITED STATES PATENTS

| | | | |
|---|---|---|---|
| 2,333,287 | 11/1943 | Baird | 61—7 |
| 2,406,039 | 8/1946 | Roedel. | |
| 2,541,631 | 2/1951 | Baskin | 161—236 X |
| 2,548,029 | 4/1951 | Kurtz et al. | 161—236 X |
| 2,893,907 | 7/1959 | Bove. | |
| 3,940,447 | 6/1963 | Chamberlain | 52—516 X |
| 3,113,435 | 12/1963 | Yount | 161—236 X |
| 3,160,512 | 12/1964 | Cash et al. | 61—7 X |
| 3,252,822 | 5/1966 | Burns | 117—30 |
| 3,252,851 | 5/1966 | Benson | 161—236 |
| 3,276,208 | 10/1966 | Bolt | 61—1 |
| 3,304,667 | 2/1967 | Donegan | 52—309 X |
| 3,314,205 | 4/1967 | Davis | 52—309 |
| 3,321,357 | 5/1967 | Kennedy | 161—236 X |
| 3,388,723 | 6/1968 | McNulty | 161—236 X |

FOREIGN PATENTS 1,281,677   12/1961   France.

DAVID J. WILLIAMOWSKY, Primary Examiner

E. G. WITMER, Assistant Examiner

U.S. Cl. X.R.

52—309, 515; 61—7; 94—9, 18; 117—138.8, 168; 161—92, 236; 220—63